US010854357B2

(12) United States Patent
Matsubayashi et al.

(10) Patent No.: US 10,854,357 B2
(45) Date of Patent: Dec. 1, 2020

(54) COATING MATERIAL FOR FORMING CONDUCTIVE RELEASE LAYER, METHOD FOR PRODUCING SAME, CONDUCTIVE RELEASE FILM, AND METHOD FOR PRODUCING SAME

(71) Applicant: SHIN-ETSU POLYMER CO., LTD., Tokyo (JP)

(72) Inventors: Sou Matsubayashi, Saitama (JP); Kohei Kanto, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 347 days.

(21) Appl. No.: 15/643,198

(22) Filed: Jul. 6, 2017

(65) Prior Publication Data
US 2018/0010017 A1 Jan. 11, 2018

(30) Foreign Application Priority Data

Jul. 11, 2016 (JP) ................................. 2016-136750

(51) Int. Cl.
*H01B 13/00* (2006.01)
*H01B 1/12* (2006.01)
*H01B 5/14* (2006.01)
*H01B 3/42* (2006.01)
*C09D 5/24* (2006.01)
*C09D 7/65* (2018.01)
*C09D 7/40* (2018.01)
*C09J 7/40* (2018.01)
*C09D 167/03* (2006.01)
*C09D 125/08* (2006.01)
*C09D 167/02* (2006.01)
*C09D 181/00* (2006.01)
*C09D 7/20* (2018.01)
*C09D 125/18* (2006.01)
*C09D 183/04* (2006.01)
*C09D 141/00* (2006.01)
*C09J 167/02* (2006.01)
*C09J 181/00* (2006.01)
*C09J 125/18* (2006.01)
*C09J 125/08* (2006.01)
*C09J 7/20* (2018.01)
*C09J 183/04* (2006.01)
*C09J 167/03* (2006.01)
*C09J 167/00* (2006.01)
(Continued)

(52) U.S. Cl.
CPC .......... *H01B 13/0036* (2013.01); *C09D 5/24* (2013.01); *C09D 7/40* (2018.01); *C09D 7/65* (2018.01); *C09J 7/401* (2018.01); *H01B 1/122* (2013.01); *H01B 1/127* (2013.01); *H01B 3/421* (2013.01); *H01B 5/14* (2013.01); *B05D 3/02* (2013.01); *B05D 5/08* (2013.01); *B05D 5/12* (2013.01); *C08K 3/08* (2013.01); *C08K 5/1515* (2013.01); *C08K 5/3467* (2013.01); *C08K 5/3477* (2013.01); *C08K 5/34924* (2013.01); *C09D 7/20* (2018.01); *C09D 125/08* (2013.01); *C09D 125/18* (2013.01); *C09D 141/00* (2013.01); *C09D 167/02* (2013.01); *C09D 167/03* (2013.01); *C09D 181/00* (2013.01); *C09D 183/04* (2013.01); *C09J 7/20* (2018.01); *C09J 7/201* (2018.01); *C09J 7/405* (2018.01); *C09J 125/08* (2013.01); *C09J 125/18* (2013.01); *C09J 167/00* (2013.01); *C09J 167/02* (2013.01); *C09J 167/03* (2013.01); *C09J 181/00* (2013.01); *C09J 183/04* (2013.01); *C09J 2301/314* (2020.08); *C09J 2425/005* (2013.01); *C09J 2467/005* (2013.01); *C09J 2467/006* (2013.01); *C09J 2471/005* (2013.01); *C09J 2481/005* (2013.01); *C09J 2483/005* (2013.01); *H01B 1/12* (2013.01); *H01B 1/124* (2013.01); *Y10T 428/1476* (2015.01); *Y10T 428/31786* (2015.04)

(58) Field of Classification Search
None
See application file for complete search history.

(56) References Cited

U.S. PATENT DOCUMENTS 4,576,999 A * 3/1986 Eckberg ................. C08G 77/38
522/170
4,640,967 A * 2/1987 Eckberg ................. C08G 77/38
522/99
(Continued)

FOREIGN PATENT DOCUMENTS

CN 101432081 A 5/2009
CN 101501133 A 8/2009
(Continued)

OTHER PUBLICATIONS

JP 2002-241613 A (Kawashima et al) (published Aug. 28, 2002) full English translation (2002) (Year: 2002).*
(Continued)

*Primary Examiner* — Vivian Chen
(74) *Attorney, Agent, or Firm* — Lando & Anastasi, LLP

(57) ABSTRACT

Provided is a coating material for forming a conductive release layer capable of forming a conductive release layer having high adhesion to a film base material, suppressing deterioration in conductivity over time in the air, and having a sufficient releasing property. The coating material for forming a conductive release layer of the present invention contains a conductive composite including a π-conjugated conductive polymer and a polyanion, an epoxy compound having an epoxy group, a curable silicone, a polyester resin, and an organic solvent.

21 Claims, No Drawings

(51) Int. Cl.
  *C08K 5/3492* (2006.01)
  *C08K 5/3477* (2006.01)
  *C08K 5/1515* (2006.01)
  *C08K 3/08* (2006.01)
  *C08K 5/3467* (2006.01)
  *B05D 3/02* (2006.01)
  *B05D 5/08* (2006.01)
  *B05D 5/12* (2006.01)

(56) References Cited

U.S. PATENT DOCUMENTS

| | | | | |
|---|---|---|---|---|
| 5,376,420 A * | 12/1994 | Yamamoto | C09D 183/04 | 428/41.4 |
| 5,415,935 A * | 5/1995 | Pankratz | C09D 183/10 | 428/352 |
| 5,468,827 A * | 11/1995 | Morita | C08G 77/38 | 528/15 |
| 5,789,485 A * | 8/1998 | Kobayashi | C09D 183/04 | 427/387 |
| 5,795,947 A * | 8/1998 | Frances | C08G 77/20 | 525/478 |
| 7,534,487 B2 * | 5/2009 | Klein | B32B 27/36 | 428/328 |
| 7,683,109 B2 * | 3/2010 | Yoshida | H01G 9/028 | 523/523 |
| 7,842,196 B2 * | 11/2010 | Yoshida | H01G 9/0425 | 252/500 |
| 10,179,868 B2 * | 1/2019 | Matsubayashi | C08K 5/1515 | |
| 2003/0211241 A1 * | 11/2003 | Tahon | C08G 61/126 | 427/231 |
| 2005/0064198 A1 * | 3/2005 | Takada | G03C 1/7954 | 428/411.1 |
| 2006/0062958 A1 * | 3/2006 | Yoshida | C08G 61/124 | 428/64.4 |
| 2006/0202171 A1 * | 9/2006 | Yoshida | C08J 3/09 | 252/500 |
| 2007/0202297 A1 * | 8/2007 | Takada | C08J 7/0427 | 428/141 |
| 2008/0138597 A1 * | 6/2008 | Asai | H01B 1/127 | 428/220 |
| 2008/0176086 A1 * | 7/2008 | Irifune | C08G 59/3254 | 428/447 |
| 2009/0197100 A1 * | 8/2009 | Yoon | C09J 7/40 | 428/447 |
| 2009/0246540 A1 * | 10/2009 | Irifune | C08G 77/14 | 428/447 |
| 2010/0028693 A1 * | 2/2010 | Okafuji | H01B 1/127 | 428/423.7 |
| 2010/0147457 A1 * | 6/2010 | Mirou | C09J 7/401 | 156/273.3 |
| 2011/0059322 A1 * | 3/2011 | Hayashizaki | H01L 21/566 | 428/447 |
| 2011/0186219 A1 * | 8/2011 | Jauer | C09J 7/40 | 156/289 |
| 2013/0284982 A1 * | 10/2013 | Chen | C09D 5/24 | 252/478 |
| 2014/0084225 A1 * | 3/2014 | Kanto | C09D 5/24 | 252/519.31 |
| 2015/0037536 A1 * | 2/2015 | Fukaya | B28B 1/30 | 428/141 |
| 2015/0218410 A1 * | 8/2015 | Matsubayashi | C08L 83/04 | 252/500 |
| 2015/0225574 A1 * | 8/2015 | Kanto | C09D 183/04 | 428/447 |
| 2015/0322273 A1 * | 11/2015 | Matsubayashi | C09D 5/24 | 428/447 |
| 2015/0348670 A1 * | 12/2015 | Fujiki | C08J 7/04 | 252/500 |
| 2015/0348671 A1 * | 12/2015 | Fujiki | H01B 1/122 | 252/500 |
| 2016/0060497 A1 * | 3/2016 | Matsubayashi | B05D 3/007 | 427/58 |
| 2016/0319137 A1 * | 11/2016 | Matsubayashi | C09D 7/40 | |
| 2017/0058167 A1 * | 3/2017 | Matsubayashi | C08L 65/00 | |
| 2018/0094119 A1 * | 4/2018 | Matsubayashi | C08F 2/10 | |
| 2018/0155877 A1 * | 6/2018 | Yamamoto | B32B 27/283 | |
| 2018/0208811 A1 * | 7/2018 | Funatsu | C08J 7/047 | |
| 2018/0244952 A1 * | 8/2018 | Matsubayashi | C08K 5/1515 | |
| 2019/0010337 A1 * | 1/2019 | Matsubayashi | C09D 7/63 | |
| 2019/0048210 A1 * | 2/2019 | Matsubayashi | H01B 1/127 | |
| 2020/0048508 A1 * | 2/2020 | Onozawa | C08G 77/46 | |

FOREIGN PATENT DOCUMENTS

| | | |
|---|---|---|
| EP | 2982712 A1 | 2/2016 |
| EP | 3231845 A1 | 10/2017 |
| JP | H01-221457 A | 9/1989 |
| JP | H07090060 A | 4/1995 |
| JP | H07165892 A | 6/1995 |
| JP | 2002-241613 A * | 8/2002 |
| JP | 2003-251756 A | 9/2003 |
| JP | 2004-202958 A * | 7/2004 |
| JP | 2006-249303 A | 9/2006 |
| JP | 2006-265297 A | 10/2006 |
| JP | 2007-128289 A | 5/2007 |
| JP | 2007-254730 A | 10/2007 |
| JP | 2008-045061 A | 2/2008 |
| JP | 2008-045116 A | 2/2008 |
| JP | 2010-234533 A * | 10/2010 |
| JP | 2011-032382 A | 2/2011 |
| JP | 2014-189597 A | 10/2014 |
| JP | 2015-131911 A | 7/2015 |
| JP | 2016023202 A | 2/2016 |
| KR | 10-2007-0056071 A | 5/2007 |
| KR | 10-2015-0118585 A | 10/2015 |
| KR | 2017-0096881 A * | 8/2017 |
| TW | 201343822 A | 11/2013 |
| TW | 201439218 A | 10/2014 |
| WO | 2005052058 A1 | 6/2005 |
| WO | WO 2013/047861 A * | 4/2013 |
| WO | WO 2014/042188 A * | 3/2014 |
| WO | 2014/125826 A1 | 8/2014 |
| WO | WO 2014/125827 A * | 8/2014 |
| WO | 2016093124 A1 | 6/2016 |

OTHER PUBLICATIONS

JP 2004-202958 A (Tsuchimoto et al) (published Jul. 22, 2004) full English translation (2004) (Year: 2004).*

* cited by examiner

COATING MATERIAL FOR FORMING CONDUCTIVE RELEASE LAYER, METHOD FOR PRODUCING SAME, CONDUCTIVE RELEASE FILM, AND METHOD FOR PRODUCING SAME

BACKGROUND OF THE INVENTION

Field of the Invention

The present invention relates to a coating material for forming a conductive release layer containing a π-conjugated conductive polymer, a method for producing the same, a conductive release film, and a method for producing the same.

Priority is claimed on Japanese Patent Application No. 2016-136750, filed on Jul. 11, 2016, the content of which is incorporated herein by reference.

Description of Related Art

Conductive release films having both conductivity and a releasing property are used in the protection and packaging of optical parts and electronic and electrical parts.

As a method for producing a conductive release film having both conductivity and a releasing property, a method of coating a conductive release agent including an addition-curable silicone emulsion, a thiophene-based conductive polymer, and a platinum-based curing catalyst on a film base material, and curing the silicone by heating is disclosed (Japanese Unexamined Patent Application, First Publication No. 2002-241613).

In addition, as another method for producing a conductive release film, a method of coating and heating a composition containing a π-conjugated conductive polymer, polyanions, a compound having an oxilane group and/or an oxetane group, an organic solvent, and a curable organopolysiloxane on a film base material is disclosed (PCT International Publication No. WO2014/125826).

SUMMARY OF THE INVENTION

However, silicone has high peelability and, in particular, since the conductive release agent described in Japanese Unexamined Patent Application, First Publication No. 2002-241613 is aqueous, the formed conductive release layer has low adhesion to the film base material. In addition, when the conductive release layer in Patent Documents 1 and 2 was left in the air, the conductivity tended to decrease with time.

An object of the present invention is to provide a coating material for forming a conductive release layer capable of forming a conductive release layer having high adhesion to a film base material, suppressing deterioration in conductivity over time in the air, and having sufficient releasing property, and a method for producing the same. In addition, an object of the present invention is to provide a conductive release film provided with a conductive release layer having high adhesion to a film base material, suppressing deterioration in conductivity over time in the air, and having a sufficient releasing property, and a method for producing the same.

The present invention has the following aspects.

[1] A coating material for forming a conductive release layer including a conductive composite including a π-conjugated conductive polymer and a polyanion, an epoxy compound having an epoxy group, a curable silicone, a polyester resin, and an organic solvent.

[2] The coating material for forming a conductive release layer according to [1], in which the curable silicone is an addition-curable silicone.

[3] The coating material for forming a conductive release layer according to [1] or [2], further including a platinum catalyst which accelerates curing of the curable silicone.

[4] The coating material for forming a conductive release layer according to any one of [1] to [3], in which the epoxy compound further has a vinyl group.

[5] The coating material for forming a conductive release layer according to [4], in which the epoxy compound is 1,2-epoxy-4-vinylcyclohexane.

[6] The coating material for forming a conductive release layer according to any one of [1] to [5], in which the epoxy group of the epoxy compound and an anion group of the polyanion are chemically bonded.

[7] The coating material for forming a conductive release layer according to any one of [1] to [6], in which the organic solvent is at least one of methyl ethyl ketone and toluene.

[8] The coating material for forming a conductive release layer according to any one of [1] to [7], in which the π-conjugated conductive polymer is poly(3,4-ethylenedioxythiophene).

[9] The coating material for forming a conductive release layer according to any one of [1] to [8], in which the polyanion is a polystyrene sulfonic acid.

[10] The coating material for forming a conductive release layer according to any one of [1] to [9], further including a highly conductive agent.

[11] The coating material for forming a conductive release layer according to any one of [1] to [10], further including triallyl isocyanurate.

[12] A method for producing a coating material for forming a conductive release layer, the method including a precipitation recovery step of adding an epoxy compound having an epoxy group to an aqueous dispersion in which a conductive composite containing a π-conjugated conductive polymer and a polyanion is included in an aqueous dispersion medium and precipitating a conductive composite to obtain a precipitate and then recovering the precipitate, and an adding step of adding an organic solvent, a curable silicone, and a polyester resin to the recovered precipitate.

[13] The method for producing a coating material for forming a conductive release layer according to [12], in which the curable silicone is an addition-curable silicone.

[14] The method for producing a coating material for forming a conductive release layer according to [12] or [13], further including a platinum catalyst which accelerates curing of the curable silicone.

[15] The method for producing a coating material for forming a conductive release layer according to any one of [12] to [14], in which the epoxy compound further has a vinyl group.

[16] The method for producing a coating material for forming a conductive release layer according to [15], in which the epoxy compound is 1,2-epoxy-4-vinylcyclohexane.

[17] A conductive release film including a film base material, and a conductive release layer formed on at least one surface of the film base material, in which the conductive release layer contains a conductive composite including a π-conjugated conductive polymer and a polyanion, an epoxy compound having an epoxy group, a silicone, and a polyester resin, and the epoxy compound having an epoxy group is bonded to the anion group of a part of the polyanion.

[18] The conductive release film according to [17], in which the film base material is a polyethylene terephthalate film.

[19] A method for producing a conductive release film, including a coating step of coating the coating material for forming a conductive release layer according to any one of [1] to [11] on at least one surface of a film base material, and a drying step of heating and drying the coated coating for forming a conductive release layer.

According to the coating material for forming a conductive release layer of the present invention, it is possible to easily form a conductive release layer having high adhesion to a base material, suppressing deterioration in conductivity over time in the air, and having a sufficient releasing property.

According to the method for producing a coating material for forming a conductive release layer of the present invention, it is possible to easily produce the coating material for forming a conductive release layer as described above.

The conductive release film of the present invention provides a conductive release layer having high adhesion to a base material, suppressing deterioration in conductivity over time in the air, and having a sufficient releasing property.

According to the method for producing a conductive release film of the present invention, it is possible to easily produce the conductive release film as described above.

DETAILED DESCRIPTION OF THE INVENTION

<Coating Material for Forming a Conductive Release Layer>

A coating material for forming a conductive release layer in one embodiment of the present invention contains a conductive composite including a π-conjugated conductive polymer and a polyanion, an epoxy compound having an epoxy group, a curable silicone, a polyester resin, and an organic solvent.

The π-conjugated conductive polymer is not particularly limited as long as it is an organic polymer having a main chain formed of a π-conjugated system and has the effect of the present invention, and examples thereof include a polypyrrole conductive polymer, a polythiophene conductive polymer, a polyacetylene conductive polymer, a polyphenylene conductive polymer, a polyphenylene vinylene conductive polymer, a polyaniline conductive polymer, a polyacene conductive polymer, a polythiophene vinylene conductive polymer, copolymers thereof, and the like. From the viewpoint of stability in the air, polypyrrole conductive polymers, polythiophenes, and polyaniline conductive polymers are preferable, and from the viewpoint of transparency, polythiophene conductive polymers are more preferable.

Examples of the polythiophene conductive polymers include polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylene dioxythiophene), poly(3,4-butylene dioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene).

Examples of the polypyrrole conductive polymers include polypyrrole, poly(N-methylpyrrole), poly(-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), and the like.

Examples of the polyaniline conductive polymer include polyaniline, poly(2-methylaniline), poly(3-isobutylaniline), poly(2-aniline sulfonic acid), and poly(3-aniline sulfonic acid). Among the π-conjugated conductive polymers described above, poly(3,4-ethylenedioxythiophene) is particularly preferable from the viewpoint of conductivity, transparency, and heat resistance.

The π-conjugated conductive polymer may be used as one type alone, or two or more types may be used in combination.

The polyanion is a polymer having two or more monomer units having an anion group in the molecule. The anion group of the polyanion functions as a dopant with respect to the π-conjugated conductive polymer to improve the conductivity of the π-conjugated conductive polymer.

The anion group of the polyanion is preferably a sulfo group or a carboxy group.

Specific examples of such a polyanion include polymers having a sulfonic acid group such as polystyrene sulfonic acid, polyvinyl sulfonic acid, polyallyl sulfonic acid, polyacrylic sulfonic acid, polymethacryl sulfonic acid, poly(2-acrylamido-2-methylpropane sulfonic acid), polyisoprene sulfonic acid, polysulfoethyl methacrylate, poly(4-sulfobutyl methacrylate), or polymethacryloxybenzene sulfonic acid, a polymer having a carboxylic acid group such as polyvinyl carboxylic acid, polystyrene carboxylic acid, polyallyl carboxylic acid, polyacrylic carboxylic acid, polymethacrylic carboxylic acid, poly(2-acrylamide-2-methylpropane carboxylic acid), polyisoprene carboxylic acid, polyacrylic acid, and the like. These may be homopolymers or may be two or more types of copolymers.

Among these polyanions, a polymer having a sulfonic acid group is preferable, and polystyrene sulfonic acid is more preferable since it is possible to further improve the conductivity.

The polyanion may be used as one type alone, or two or more types may be used in combination.

The weight average molecular weight of the polyanion is preferably 20,000 or more and 1,000,000 or less, and more preferably 100,000 or more and 500,000 or less.

The weight average molecular weight in this specification is a value measured by gel permeation chromatography and determined with polystyrene as the standard substance.

The content ratio of the polyanion in the conductive composite is preferably in the range of 1 part by mass to 1,000 parts by mass with respect to 100 parts by mass of the π-conjugated conductive polymer, more preferably 10 parts by mass or more and 700 parts by mass or less, and even more preferably in the range of 100 parts by mass or more and 500 parts by mass or less. When the content ratio of the polyanion is less than the lower limit value, the doping effect on the π-conjugated conductive polymer tends to be weak, and the conductivity may be insufficient, in addition, the dispersibility of the conductive composite in the coating material for forming a conductive release layer becomes low. On the other hand, when the content of the polyanion exceeds the upper limit value, the content of the π-conjugated conductive polymer decreases, and it is difficult to obtain sufficient conductivity.

The polyanion is coordinated to and doped with a π-conjugated conductive polymer to form a conductive composite.

However, in the polyanion in the present embodiment, not all the anion groups are doped in the π-conjugated conductive polymer, and there are excess anion groups which do not contribute to the doping.

The epoxy compound used in the present embodiment is a compound having an epoxy group, and the epoxy group reacts with the anion group of the polyanion to form a chemical bond. Specifically, the epoxy compound is able to coordinate bond or covalent bond to anion groups of the polyanion, in particular, to excess anion groups which do not contribute the doping, to make the conductive composite hydrophobic. The hydrophobized conductive composite has high dispersibility in an organic solvent.

Specific examples of the epoxy compounds include neopentyl glycol diglycidyl ether, 1,6-hexanediol diglycidyl ether, trimethylolpropane polyglycidyl ether, hexahydrophthalic acid diglycidyl ester, hydrogenated bisphenol A diglycidyl ether, propylene glycol diglycidyl ether, tripropylene glycol diglycidyl ether, polypropylene glycol diglycidyl ether, fatty acid-modified epoxy, diethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, ethylene oxide lauryl alcohol glycidyl ether, ethylene oxide phenol glycidyl ether, C12, C13 mixed higher alcohol glycidyl ether, 1,2-epoxy-4-vinylcyclohexane, adipic acid glycidyl ether, triglycidyl tris(2-hydroxyethyl) isocyanate, and the like.

These epoxy compounds may be used alone as one type or two or more types may be used in combination.

Among the epoxy compounds, those epoxy compounds further having a vinyl group are more preferable. When the epoxy compound further has a vinyl group together with the epoxy group, the vinyl groups of the epoxy group or the binder component having the vinyl group reacts at the time of formation of the conductive release layer, thus it is possible for the conductive composites in which the epoxy compound is bonded or binder components having a vinyl group to be crosslinked to form a strong coating film. As an epoxy compound further having a vinyl group, 1,2-epoxy-4-vinylcyclohexane is preferable from the viewpoint of easy availability.

An epoxy compound having a vinyl group and an epoxy compound having no vinyl group may be used in combination.

The content ratio of the epoxy compound is preferably 10 parts by mass or more and 300 parts by mass or less, and more preferably 50 parts by mass or more and 150 parts by mass or less when the conductive composite is 100 parts by mass. When the content ratio of the epoxy compound is the lower limit value or more, the dispersibility of the conductive composite with respect to the organic solvent becomes higher, and when the upper limit value or less, it is possible to prevent deterioration in conductivity.

The curable silicone is a component for imparting a releasing property to the conductive layer.

The curable silicone may be either of addition-curable silicone and condensation curing silicone.

The addition-curable silicone is a linear polymer having a siloxane bond and examples thereof include polydimethylsiloxane having a vinyl group at both ends of the straight chain, and silicone having hydrogen silane. Such an addition-curable silicone forms a three-dimensional crosslinked structure by an addition reaction and is cured. In order to accelerate the curing, a platinum catalyst may be contained in the coating material for forming a conductive release layer.

The platinum catalyst is preferably contained in an amount of 1 to 1,000 ppm with respect to 100 g of the coating material including 3 g of an addition silicone, and more preferably in an amount of 10 to 100 ppm. When the lower limit value or more and the upper limit value or less, sufficient curing is possible and it is possible to reduce the possibility that the peeling force will increase due to the platinum catalyst being excessive.

Specific examples of the addition-curable silicone include KS-3703T, KS-847T, KM-3951, X-52-151, X-52-6068, and X-52-6069 (manufactured by Shin-Etsu Chemical Co., Ltd.).

As the addition-curable silicone, silicone dissolved or dispersed in an organic solvent is preferably used.

In addition-curable silicone, curing inhibition occurs due to the presence of the amine compound. However, in the coating material for forming a conductive release layer of the present embodiment, since the conductive composite is dispersible in an organic solvent due to the epoxy compound, there is no need to blend an amine compound in order to make the anion group non-hydrophilic. Therefore, it is possible to sufficiently cure the addition-curable silicone in the coating material for forming a conductive release layer of the present embodiment.

The content ratio of the curable silicone preferably has a mass of 1 time or more and 1,000 times or less and more preferably 3 times or more and 100 times or less the mass of the conductive composite. When the content ratio of the curable silicone is the lower limit value or more, it is possible to sufficiently improve the releasing property of the obtained conductive release layer, and when the upper limit value or less, it is possible to secure sufficient conductivity.

The polyester resin is a condensation polymer of a polybasic carboxylic acid having two or more carboxy groups and a polyhydric alcohol having two or more hydroxy groups. This polyester resin is not a polyanion. Specific examples of the polyester resin include polyethylene terephthalate, polybutylene terephthalate, polyethylene naphthalate, polymethylene terephthalate, and the like. These polyester resins may be used alone as one type or two or more types may be used in combination.

The number average molecular weight of the polyester resin is preferably 1,000 or more and 100,000 or less, and more preferably 10,000 or more and 50,000 or less. When the number average molecular weight of the polyester resin is the lower limit value or more, it is possible to further prevent deterioration in conductivity over time in the air, and when the upper limit value or less, it is possible to improve solubility in an organic solvent. The number average molecular weight of the polyester resin is a value measured by using gel permeation chromatography and determined using polystyrene as a standard substance.

The glass transition temperature of the polyester resin is preferably 40° C. or more and 90° C. or less, and more preferably 60° C. or more and 85° C. or less. When the glass transition temperature of the polyester resin is the lower limit value or more, it is possible to further prevent deterioration in conductivity over time in the air, and when the upper limit value or less, it is possible to improve the solubility in an organic solvent. The glass transition temperature of the polyester resin is determined by differential scanning calorimetry.

The content ratio of the mass of the polyester resin is preferably 1 to 1,000 times and more preferably 3 to 100 times the mass of the conductive composite. When the content ratio of the polyester resin is the lower limit value or more, it is possible to further prevent deterioration of the conductivity of the obtained conductive release layer over time, and it is possible to secure sufficient conductivity when the upper limit value or less.

Examples of the organic solvent used in the present embodiment include an alcohol solvent, a ketone solvent, an ester solvent, an aromatic hydrocarbon solvent, an amide solvent, and the like. The organic solvent may be used alone as one type, or two or more types may be used in combination.

Examples of the alcohol solvents include methanol, ethanol, isopropanol, n-butanol, t-butanol, allyl alcohol, and the like.

Examples of the ketone solvent include diethyl ketone, methyl propyl ketone, methyl butyl ketone, methyl isopropyl ketone, methyl isobutyl ketone, methyl amyl ketone, diisopropyl ketone, methyl ethyl ketone, acetone, diacetone alcohol, and the like.

Examples of the ester solvents include ethyl acetate, propyl acetate, butyl acetate, and the like.

Examples of the aromatic hydrocarbon solvents include benzene, toluene, xylene, ethylbenzene, propylbenzene, isopropylbenzene, and the like.

Examples of the amide solvents include N-methylpyrrolidone, dimethylacetamide, dimethylformamide, and the like.

Among the organic solvents, at least one of methyl ethyl ketone and toluene is preferable from the viewpoint of versatility.

Water may be included together with an organic solvent as a dispersion medium. However, when the total amount of the organic solvent and water is 100% by mass, the content ratio of water is preferably 10% by mass or less, more preferably 5% by mass or less, even more preferably 1% by mass or less, and particularly preferably 0% by mass or less. When the content ratio of water in the dispersion medium is small, the drying speed of the coating material for forming a conductive release layer increases. In addition, when the content ratio of water in the dispersion medium is small, the wettability with the film base material to which the coating material for forming a conductive release layer is applied is further increased, and it is possible to further increase the adhesion between the conductive release layer formed from the coating material for forming a conductive release layer and the film base material.

The coating material for forming a conductive release layer may contain triallyl isocyanurate. When the coating material for forming a conductive release layer contains triallyl isocyanurate, the conductivity improving effect and the conductivity suppressing effect in the air are further increased.

The content of triallyl isocyanurate is preferably 0.1 times or more and 10,000 times or less the conductive composite, more preferably 0.5 times or more and 5,000 times or less, and even more preferably 1 time or more and 1,000 times or less. When the content of triallyl isocyanurate is the lower limit value or more, the conductivity improving effect and conductivity suppressing effect in the air are sufficiently exhibited, and when the upper limit value or less, it is possible to prevent deterioration in conductivity due to a decrease in the concentration of the π-conjugated conductive polymer.

In order to further improve the conductivity, the coating for forming a conductive release layer may include an additional conductive agent, also referred to as a highly conductive agent herein, for improving the conductivity of the conductive release layer including the conductive composite.

Specifically, the highly conductive agent may be at least one type of compound selected from a group formed of a saccharide, a nitrogen-including aromatic cyclic compound, a compound having two or more hydroxy groups, a compound having one or more hydroxy groups and one or more carboxy groups, a compound having an amide group, a compound having an imide group, a lactam compound, and a compound having a glycidyl group. The highly conductive agent may be used alone as one type, or two or more types may be used in combination.

The highly conductive agent is preferably contained in an amount of 10 to 10,000 parts by mass with respect to 100 parts by mass of the conductive composite.

Examples of nitrogen-including aromatic cyclic compounds include pyridines including one nitrogen atom and derivatives thereof, imidazoles including two nitrogen atoms and derivatives thereof, pyrimidines and derivatives thereof, pyrazines and derivatives thereof, triazines including three nitrogen atoms and derivatives thereof, and the like. From the viewpoint of solvent solubility and the like, pyridines and derivatives thereof, imidazoles and derivatives thereof, pyrimidines and derivatives thereof are preferable.

Specific examples of pyridines and derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl) ethane, 1,2-di(4-pyridyl) propane, 2-pyridinecarboxaldehyde, 2-pyridinecarboxylic acid, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, 3-pyridine sulfonic acid, and the like.

Specific examples of imidazoles and derivatives thereof include imidazole, 2-methylimidazole, 2-propylimidazole, 2-undecylimidazole, 2-phenylimidazole, N-methylimidazole, N-vinylimidazole, N-allylimidazole, 1-(2-hydroxyethyl) imidazole (N-hydroxyethylimidazole), 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazole dicarboxylic acid, dimethyl 4,5-imidazole dicarboxylate, benzimidazole, 2-aminobenzimidazole, 2-aminobenzimidazole-2-sulfonic acid, 2-amino-1-methylbenzimidazole, 2-hydroxybenzimidazole, 2-(2-pyridyl) benzimidazole, and the like.

Specific examples of pyrimidines and derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, 2,4-pyrimidinediol, and the like.

Specific examples of pyrazines and derivatives thereof include pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2,3-dimethylpyrazine, 2,3-diethylpyrazine, and the like.

Specific examples of triazines and derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridine-1,3,5-triazine, 3-(2-pyridine)-5,6-bis(4-phenyl sulfonic acid)-1,2,4-triazine disodium, 3-(2-pyridine)-5,6-diphenyl-1,2,4-triazine, 3-(2-pyridine)-5,6-diphenyl-1,2,4-triazine-ρ,ρ'-disodium disulfonate, 2-hydroxy-4,6-dichloro-1,3,5-triazine, and the like.

Examples of the compound having two or more hydroxy groups include polyhydric aliphatic alcohols such as propylene glycol, 1,3-butylene glycol, 1,4-butylene glycol, D-glucose, D-glucitol, isoprene glycol, dimethylolpropionic acid, butanediol, 1,5-pentanediol, 1,6-hexanediol, 1,9-nonanediol, neopentyl glycol, trimethylol ethane, trimethylol propane, pentaerythritol, dipentaerythritol, thiodiethanol, glucose, tartaric acid, D-glucaric acid, and glutaconic acid; polymeric alcohols such as cellulose, polysaccharide, and sugar alcohol; aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxydiphenylsulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinone sulfone acid, and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, 1,4-dihydroxy-2-naphthoic acid phenyl ester, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid, and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzoaldehyde, trihydroxyanthraquinone, 2,4,6-trihydroxybenzene, tetrahydroxy-p-benzoquinone, tetrahydroxyanthraquinone, methyl gallic acid (methyl gallate), and ethyl gallic acid (ethyl gallate), potassium hydroquinone sulfonate, and the like.

Examples of compounds having one or more hydroxy groups and one or more carboxy groups include tartaric acid, glyceric acid, dimethylolbutanoic acid, dimethylolpropanoic acid, D-glucaric acid, glutaconic acid, and the like.

A compound having an amide group is a monomolecular compound having an amide bond represented by —CO—NH— (the CO part is a double bond) in the molecule. That is, examples of the amide compound include a compound having a functional group at both ends of the bond, a compound in which a cyclic compound is bonded to one end of the bond, urea and urea derivatives where functional groups of both ends are hydrogen, and the like.

Specific examples of the amide compound include acetamide, malonamide, succinamide, maleamide, fumaramide, benzamide, naphthamide, phthalamide, isophthalamide, terephthalamide, nicotinamide, isonicotinamide, 2-furamide, formamide, N-methylformamide, propionamide, propiolamide, butyramide, isobutyramide, palmitamide, stearylamide, oleamide, oxamide, glutaramide, adipamide, cinnamamide, glycolamide, lactoamide, glyceramide, tartaramide, citrullamide, glyoxylamide, pyruvamide, acetoacetamide, dimethylacetamide, benzyl amide, anthranilamide, ethylenediamine tetraacetamide, diacetamide, triacetamide, dibenzamide, tribenzamide, rhodanine, urea, 1-acetyl-2-thiourea, biuret, butylurea, dibutylurea, 1,3-dimethylurea, 1,3-diethylurea, derivatives thereof, and the like.

In addition, as the amide compound, it is also possible to use acrylamide. Examples of acrylamide include N-methylacrylamide, N-methylmethacrylamide, N-ethylacrylamide, N-ethylmethacrylamide, N,N-dimethylacrylamide, N,N-dimethylmethacrylamide, N,N-diethylacrylamide, N,N-diethylmethacrylamide, 2-hydroxyethylacrylamide, 2-hydroxyethylmethacrylamide, N-methylolacrylamide, N-methylolmethacrylamide, and the like.

The molecular weight of the amide compound is preferably 46 or more and 10,000 or less, more preferably 46 or more and 5,000 or less, and particularly preferably 46 or more and 1,000 or less.

As an amide compound, a monomolecular compound having an imide bond (referred to below as an imide compound) is preferable due to having higher conductivity. Examples of imide compounds include phthalimide and phthalimide derivatives, succinimide and succinimide derivatives, benzimide and benzimide derivatives, maleimide and maleimide derivatives, naphthalimide and naphthalimide derivatives, and the like from the skeleton thereof.

In addition, the imide compound is classified into aliphatic imide, aromatic imides, and the like depending on the type of the functional group at both ends, but from the viewpoint of solubility, aliphatic imide is preferable.

Furthermore, the aliphatic imide compounds are classified into saturated aliphatic imide compounds having no unsaturated bond between carbons in the molecule and unsaturated aliphatic imide compounds having an unsaturated bond between carbons in the molecule.

The saturated aliphatic imide compound is a compound represented by $R^1$—CO—NH—CO—$R^2$, and both of $R^1$ and $R^2$ are saturated hydrocarbons. Specific examples thereof include cyclohexane-1,2-dicarboximide, allantoin, hydantoin, barbituric acid, alloxan, glutarimide, succinimide, 5-butylhydantoin acid, 5,5-dimethylhydantoin, 1-methylhydantoin, 1,5,5-trimethylhydantoin, 5-hydantoin acetic acid, N-hydroxy-5-norbornene-2,3-dicarboximide, semicarbazide, α,α-dimethyl-6-methylsuccinimide, bis[2-(succinimidoxycarbonyloxy) ethyl] sulfone, α-methyl-α-propyl succinimide, cyclohexyl imide, and the like.

The unsaturated aliphatic imide compound is a compound represented by $R^1$—CO—NH—CO—$R^2$, and one or both of $R^1$ and $R^2$ is one or more unsaturated bonds. Specific examples thereof include 1,3-dipropyleneurea, maleimide, N-methylmaleimide, N-ethylmaleimide, N-hydroxymaleimide, 1,4-bismaleimidebutane, 1,6-bismaleimidehexane, 1,8-bismaleimide octane, N-carboxyheptyl maleimide, and the like.

The molecular weight of the imide compound is preferably 60 or more and 5,000 or less, more preferably 70 or more and 1,000 or less, and particularly preferably 80 or more and 500 or less.

The lactam compound is an intramolecular cyclic amide of an aminocarboxylic acid, and a part of the ring is —CO—NR— (R is hydrogen or an optional substituent). However, one or more carbon atoms of the ring may be replaced by unsaturation or hetero atom.

Examples of the lactam compound include pentano-4-lactam, 4-pentanelactam-5-methyl-2-pyrrolidone, 5-methyl-2-pyrrolidinone, hexano-6-lactam, 6-hexyllactam, and the like.

Examples of the compound having a glycidyl group include glycidyl compounds such as ethyl glycidyl ether, butyl glycidyl ether, t-butyl glycidyl ether, allyl glycidyl ether, benzyl glycidyl ether, glycidyl phenyl ether, bisphenol A, diglycidyl ether, acrylic acid glycidyl ether, and methacrylic acid glycidyl ether, and the like.

The content ratio of the highly conductive agent is preferably 1 time or more and 1,000 times or less with respect to the total mass of the conductive composite, and more preferably 2 times or more and 100 times or less. When the content ratio of the highly conductive agent is the lower limit value or more, the conductivity improving effect due to addition of the highly conductive agent is sufficiently exhibited, and when the upper limit value or less, it is possible to prevent the deterioration of the conductivity caused by the decrease of the concentration of the π-conjugated conductive polymer.

Known additives may be included in the coating material for forming a conductive release layer.

The additives are not particularly limited as long as the effect of the present invention is retained and, for example, it is possible to use a surfactant, an inorganic conductive agent, a defoaming agent, a coupling agent, an antioxidant, an ultraviolet absorber, and the like. However, the additives are formed of compounds other than the polyanion, the epoxy compound, the curable silicone, the polyester resin, the organic solvent, the triallyl isocyanurate, and the highly conductive agent.

The triallyl isocyanurate is preferably 10 to 10,000 parts by mass with respect to 100 parts by mass of the conductive composite.

Examples of the surfactant include nonionic, anionic, and cationic surfactants, and nonionic surfactants are preferable from the viewpoint of storage stability. In addition, polymer surfactants such as polyvinyl alcohol and polyvinyl pyrrolidone may also be added.

Examples of the inorganic conductive agent include metal ions, conductive carbon, and the like. Here, it is possible to generate the metal ions by dissolving the metal salt in water.

Examples of the defoaming agent include silicone resin, polydimethylsiloxane, silicone oil, and the like.

Examples of the coupling agent include a silane coupling agent having a vinyl group, an amino group, an epoxy group, or the like.

Examples of the antioxidant include a phenol type antioxidant, an amine type antioxidant, a phosphorus type antioxidant, a sulfur type antioxidant, a saccharide, and the like.

Examples of the ultraviolet absorber include benzotriazole type ultraviolet absorbers, benzophenone type ultraviolet absorbers, salicylate type ultraviolet absorbers, cyanoacrylate type ultraviolet absorbers, oxanilide type ultraviolet absorbers, hindered amine type ultraviolet absorbers, benzoate type ultraviolet absorbers, and the like.

In a case where the coating material for forming a conductive release layer contains the additives described above, the content ratio thereof is appropriately determined depending on the type of the additive; however, usually, the content ratio is in a range of 0.001 parts by mass or more and 5 parts by mass or less with respect to 100 parts by mass of the solid content of the conductive composite.

A method for producing a coating material for forming a conductive release layer for obtaining the coating material for forming a conductive release layer described above includes a precipitation recovery step and an adding step.

The precipitation recovery step is a step of adding an epoxy compound to the conductive polymer aqueous dispersion, precipitating a conductive composite to obtain a precipitate, and then recovering the precipitate by filtration.

When an epoxy compound is added to the conductive polymer aqueous dispersion, at least a part of the epoxy groups of the epoxy compound reacts with the anion group of the polyanion. Due to this, since the conductive composite becomes hydrophobic, it becomes difficult to stably disperse the conductive composite in the aqueous dispersion, and the conductive composite precipitates into a precipitate.

The conductive polymer aqueous dispersion is a dispersion in which a conductive composite containing a π-conjugated conductive polymer and a polyanion is included in an aqueous dispersion medium.

The conductive polymer aqueous dispersion may be obtained, for example, by chemically oxidizing and polymerizing a monomer forming a π-conjugated conductive polymer in an aqueous solution of a polyanion. In addition, commercially available conductive polymer aqueous dispersions may be used.

It is preferable that the water content of the precipitate obtained by the precipitation recovery step is as small as possible and it is most preferable that moisture is not contained at all, but from a practical viewpoint, moisture content may be included in the range of 10% by mass or less.

Examples of a method for reducing the water content include a method of washing away precipitates with an organic solvent, a method of drying precipitates, and the like.

The adding step is a step of adding an organic solvent, a curable silicone, and a polyester resin to the recovered precipitate.

After the addition of the organic solvent, the curable silicone, and the polyester resin to the precipitate, it is preferable to carry out a dispersion treatment by stirring. There is no particular limitation on the method of stirring, and the stirring may be stirring with a weak shear force such as a stirrer, or the stirring may be performed using a disperser with a high shear force (such as a homogenizer).

In a case where a highly conductive agent, triallyl isocyanurate, additives, and the like are contained in the coating material for forming a conductive release layer, the highly conductive agent, triallyl isocyanurate, additives, and the like are preferably added after the addition of the organic solvent.

In the coating material for forming a conductive release layer of the present embodiment, since the anion group of the polyanion is made non-hydrophilic by the epoxy compound, it is possible to disperse the conductive composite in the organic solvent with high dispersibility.

The polyester resin is a resin having low air permeability. Therefore, it is possible to prevent oxidative deterioration of the conductive composite included in the conductive release layer formed from the coating material for forming a conductive release layer and to suppress deterioration in conductivity over time in the air.

In addition, since the coating material for forming a conductive release layer includes the polyester resin, the conductive release layer formed from the coating material for forming a conductive release layer has high adhesion to the film base material. In particular, in a case where a polyethylene terephthalate film is used as the film base material of the conductive release film, the adhesion of the conductive release layer to the film base material becomes higher.

Since the silicone (polyorganosiloxane) has a smaller specific gravity than the polyester resin, silicone is unevenly distributed in the vicinity of the surface in the conductive release layer formed from the coating material for forming a conductive release layer, and the polyester resin is unevenly distributed in the vicinity of the film base material. Accordingly, it is possible for the conductive release layer formed from the coating material for forming a conductive release layer to sufficiently exhibit a releasing property and to exhibit high adhesion to the film base material.

<Conductive Film and Method for Producing the Same>

A method for producing a conductive film according to one embodiment of the present invention has a coating step of coating the coating material for forming a conductive release layer onto at least one surface of a film base material to form a coated film, and a drying step of heating and drying the coated coating material for forming a conductive release layer.

The conductive film obtained by this production method is provided with a film base material and a conductive release layer formed on at least one surface of the film base material, in which the conductive release layer contains a conductive composite formed by bonding an epoxy compound, a silicone, and a polyester resin.

The average thickness of the conductive release layer is preferably 10 nm or more and 20,000 nm or less, more preferably 20 nm or more and 10,000 nm or less, and even more preferably 30 nm or more and 5,000 nm or less. When the average thickness of the conductive release layer is the lower limit value or more, it is possible to exhibit sufficiently high conductivity, and when the upper limit value or less, it is possible to easily form the conductive release layer.

Examples of the film base material used in the coating step of the present embodiment include a plastic film.

Examples of the resin for the film base material forming the plastic film include ethylene-methyl methacrylate copolymer resin, ethylene-vinyl acetate copolymer resin, polyethylene, polypropylene, polystyrene, polyvinyl chloride, polyvinyl alcohol, polyethylene terephthalate, polybutylene terephthalate, polyethylene naphthalate, polyacrylate, polycarbonate, polyvinylidene fluoride, polyarylate, styrene elastomer, polyester elastomer, polyether sulfone, polyether imide, polyether ether ketone, polyphenylene sulfide, polyimide, cellulose triacetate, cellulose acetate propionate, and the like. Among these resins for a film base material, polyethylene terephthalate and cellulose triacetate are preferable from the viewpoint of low cost and excellent mechanical strength, and polyethylene terephthalate is more preferable.

The resin for a film base material may be amorphous or may be crystalline.

In addition, the film base material may be unstretched or may be stretched.

In addition, the film base material may be subjected to a surface treatment such as corona discharge treatment, plasma treatment, flame treatment or the like in order to improve the adhesion of the conductive release layer formed from the coating material for forming a conductive release layer.

The average thickness of the film base material is preferably 10 µm or more and 500 µm or less, and more preferably 20 µm or more and 200 µm or less. When the average thickness of the film base material is the lower limit value or more, breakage is unlikely to occur, and when the upper limit value or less, it is possible to secure sufficient flexibility as a film.

The thickness in the present specification is a value obtained by measuring the thickness for arbitrary 10 places and averaging the measured values.

As a method for coating the coating material for forming a conductive release layer, it is possible to apply a coating method using a coater such as a gravure coater, a roll coater, a curtain flow coater, a spin coater, a bar coater, a reverse coater, a kiss coater, a fountain coater, a rod coater, an air doctor coater, a knife coater, a blade coater, a cast coater, a screen coater, or the like, a spraying method using an sprayer such as air spraying, airless spraying, and rotor dampening, a dipping method such as dipping or the like.

Among these, a bar coater may be used since simple application is possible. In the bar coater, the coating thickness varies depending on the type thereof, and in the commercially available bar coater, a number is given for each type, and as the number is larger, a thicker coating is possible.

The coating amount of the coating material for forming a conductive release layer on the film base material is not particularly limited, but is preferably in the range of 0.1 g/m$^2$ or more and 10.0 g/m$^2$ or less in solid content.

In the drying step, the coating material for forming a conductive release layer is dried and the curable silicone is cured.

As a heating method in the drying step, for example, it is possible to adopt usual methods such as hot air heating and infrared heating. The heating temperature is preferably 50° C. or higher and 200° C. or lower, and more preferably 80° C. or higher and 170° C. or lower. When the heating temperature is the lower limit value or more, it is possible to sufficiently dry the coating material for forming a conductive release layer and to sufficiently cure the curable silicone and when the heating temperature is the upper limit value or less, it is possible to prevent the melting of the film base material.

Since the conductive release film of the present embodiment is formed by coating the coating material for forming a conductive release layer on a film base material, the conductive release layer has high adhesion to the film base material and deterioration in conductivity over time in the air is suppressed. In addition, the conductive release layer has a sufficient releasing property.

According to the method for producing a conductive release film of the present embodiment, it is possible to easily produce the conductive release film as described above.

EXAMPLES

Production Example 1

206 g of sodium styrene sulfonate was dissolved in 1,000 ml of ion-exchanged water and 1.14 g of an ammonium persulfate oxidizing agent solution previously dissolved in 10 ml of water was added dropwise thereto for 20 minutes while stirring at 80° C., and the solution was stirred for 12 hours.

1,000 ml of sulfuric acid diluted to 10% by mass was added to the obtained sodium styrenesulfonate-containing solution, approximately 1,000 ml of the polystyrene sulfonic acid-containing solution was removed by an ultrafiltration method, 2,000 ml of ion-exchanged water was added to the residue, and approximately 2,000 ml of solution was removed by an ultrafiltration method. The ultrafiltration operation described above was repeated three times. Furthermore, approximately 2,000 ml of ion-exchanged water was added to the obtained filtrate, and approximately 2,000 ml of the solution was removed by an ultrafiltration method. This ultrafiltration operation was repeated three times.

Water in the obtained solution was removed under reduced pressure to obtain a colorless solid polystyrene sulfonic acid.

Production Example 2

14.2 g of 3,4-ethylenedioxythiophene and a solution prepared by dissolving 36.7 g of polystyrene sulfonic acid in 2,000 ml of ion-exchanged water were mixed at 20° C.

The mixed solution thus obtained was kept at 20° C. and 29.64 g of ammonium persulfate dissolved in 200 ml of ion-exchanged water and an oxidation catalyst solution of 8.0 g of ferric sulfate were slowly added while stirring, and the mixture was reacted with stirring for 3 hours.

2,000 ml of ion-exchanged water was added to the obtained reaction solution, and approximately 2,000 ml of the solution was removed by an ultrafiltration method. This operation was repeated three times.

Then, 200 ml of sulfuric acid diluted to 10% by mass and 2,000 ml of ion-exchanged water were added to the obtained solution, approximately 2,000 ml of the solution was removed by an ultrafiltration method, 2,000 ml of ion-exchanged water was added to this solution, and approximately 2,000 ml of solution was removed by an ultrafiltration method. This operation was repeated three times.

2,000 ml of ion-exchanged water was added to the obtained solution, and approximately 2,000 ml of the solution was removed by an ultrafiltration method. This operation was repeated 5 times to obtain a 1.2% by mass polystyrene sulfonic acid-doped poly(3,4-ethylenedioxythiophene) aqueous dispersion (PEDOT-PSS aqueous dispersion).

Production Example 3

300 g of methanol, 22.5 g of Epolight M-1230 (C12, C13 mixed higher alcohol glycidyl ether manufactured by Kyoeisha Chemical Co., Ltd.), and 2.5 g of 1,2-epoxy-4-vinylcyclohexane were added to 100 g of the PEDOT-PSS aqueous dispersion obtained in Production Example 2, and the mixture was stirred at 50° C. for 4 hours. After stirring, the deposited precipitate was filtered, washed twice with 100 g of methanol, then 1,470 g of methyl ethyl ketone were added and subjected to a dispersion treatment using a high-pressure homogenizer to obtain a conductive polymer dispersion (solid content concentration 0.11% by mass).

Production Example 4

140 g of methyl ethyl ketone and 1.2 g of a platinum catalyst (CAT-PL-50T, manufactured by Shin-Etsu Chemical Co., Ltd.) were added to 40 g of an addition-curable silicone (KS-3703T, manufactured by Shin-Etsu Chemical Co., Ltd., solid content concentration: 30% by mass, toluene solution) to obtain a silicone solution (solid content concentration: 6.6% by mass).

Production Example 5

140 g of methyl ethyl ketone and 1.2 g of a platinum catalyst (CAT-PL-50T, manufactured by Shin-Etsu Chemical Co., Ltd.) were added to 40 g of an addition-curable silicone (KS-847T, manufactured by Shin-Etsu Chemical Co., Ltd., solid content concentration: 30% by mass, toluene solution) to obtain a silicone solution (solid content concentration: 6.6% by mass).

Production Example 6

20 g of a polyester resin (Byron 240, number average molecular weight 15,000, glass transition temperature 60° C., manufactured by Toyobo Co., Ltd.) was dissolved in 80 g of methyl ethyl ketone to obtain a polyester resin solution (solid content concentration: 20% by mass).

Production Example 7

20 g of a polyester resin (Byron 880, number average molecular weight 18,000, glass transition temperature 84° C., manufactured by Toyobo Co., Ltd.) was dissolved in 80 g of methyl ethyl ketone to obtain a polyester resin solution (solid content concentration: 20% by mass).

Example 1

1.2 g of the silicone solution of Production Example 4, 3.6 g of the polyester resin solution of Production Example 6, and 11.2 g of methyl ethyl ketone were added to 14 g of the conductive polymer dispersion of Production Example 3 to obtain a coating material for forming a conductive release layer. The coating material for forming a conductive release layer was coated on a polyethylene terephthalate film (Lumirror T60, manufactured by Toray Industries, Inc.) using a No. 8 bar coater, dried at 150° C. for 2 minutes to form a conductive release layer to obtain a conductive release film.

Example 2

3.6 g of the silicone solution of Production Example 4, 2.8 g of the polyester resin solution of Production Example 6, and 9.6 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 3

6.0 g of the silicone solution of Production Example 4, 2.0 g of the polyester resin solution of Production Example 6, and 8.0 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 4

8.4 g of the silicone solution of Production Example 4, 1.2 g of the polyester resin solution of Production Example 6, and 6.4 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 5

10.8 g of the silicone solution of Production Example 4, 0.4 g of the polyester resin solution of Production Example 6, and 4.8 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 6

12 g of the silicone solution of Production Example 4 and 4 g of the polyester resin solution of Production Example 6 were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 7

3.0 g of the silicone solution of Production Example 4, 1.0 g of the polyester resin solution of Production Example 6, and 12 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 8

1.2 g of the silicone solution of Production Example 4, 3.6 g of the polyester resin solution of Production Example 7, and 11.2 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 9

3.6 g of the silicone solution of Production Example 4, 2.8 g of the polyester resin solution of Production Example 7, and 9.6 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 10

6.0 g of the silicone solution of Production Example 4, 2.0 g of the polyester resin solution of Production Example 7, and 8.0 g of methyl ethyl ketone were added to 14 g of the conductive polymer dispersion of Production Example 3, to obtain a coating material for forming a conductive release layer. A conductive release film was obtained in the same manner as in Example 1 except that the coating material for forming a conductive release layer was used.

Example 11

8.4 g of the silicone solution of Production Example 4, 1.2 g of the polyester resin solution of Production Example 7, and 6.4 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 12

10.8 g of the silicone solution of Production Example 4, 0.4 g of the polyester resin solution of Production Example 7, and 4.8 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 13

12 g of the silicone solution of Production Example 4 and 4 g of the polyester resin solution of Production Example 7 were added to 14 g of the conductive polymer dispersion of Production Example 3 to obtain a coating for forming a conductive material release layer. A conductive release film was obtained in the same manner as in Example 1 except that the coating material for forming a conductive release layer was used.

Example 14

3 g of the silicone solution of Production Example 4, 1 g of the polyester resin solution of Production Example 7, and 12 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 15

1.2 g of the silicone solution of Production Example 5, 3.6 g of the polyester resin solution of Production Example 6, and 11.2 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 16

3.6 g of the silicone solution of Production Example 5, 2.8 g of the polyester resin solution of Production Example 6, and 9.6 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 17

6.0 g of the silicone solution of Production Example 5, 2.0 g of the polyester resin solution of Production Example 6, and 8.0 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 18

8.4 g of the silicone solution of Production Example 5, 1.2 g of the polyester resin solution of Production Example 6, and 6.4 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 19

10.8 g of the silicone solution of Production Example 5, 0.4 g of the polyester resin solution of Production Example 6, and 4.8 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 20

12 g of the silicone solution of Production Example 5 and 4 g of the polyester resin solution of Production Example 6 were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 21

3 g of the silicone solution of Production Example 5, 1 g of the polyester resin solution of Production Example 6, and 12 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 22

1.2 g of the silicone solution of Production Example 5, 3.6 g of the polyester resin solution of Production Example 7, and 11.2 g of methyl ethyl ketone were added to 14 g of the conductive polymer dispersion of Production Example 3 to prepare a coating material for forming a conductive release layer. A conductive release film was obtained in the same manner as in Example 1 except that the coating material for forming a conductive release layer was used.

Example 23

3.6 g of the silicone solution of Production Example 5, 2.8 g of the polyester resin solution of Production Example 7, and 9.6 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 24

6.0 g of the silicone solution of Production Example 5, 2.0 g of the polyester resin solution of Production Example 7, and 8.0 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 25

8.4 g of the silicone solution of Production Example 5, 1.2 g of the polyester resin solution of Production Example 7, and 6.4 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 26

10.8 g of the silicone solution of Production Example 5, 0.4 g of the polyester resin solution of Production Example 7, and 4.8 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 27

12 g of the silicone solution of Production Example 5 and 4 g of the polyester resin solution of Production Example 7 were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 28

3 g of the silicone solution of Production Example 5, 1 g of the polyester resin solution of Production Example 7, and 12 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 29

1.2 g of the silicone solution of Production Example 4, 3.6 g of the polyester resin solution of Production Example 6, 11.2 g of methyl ethyl ketone, and 0.21 g of dimethylsulfoxide (denoted as "DMSO" in the table) were added to 14 g of the conductive polymer dispersion of Production Example 3 to obtain a coating material for forming a conductive release layer. A conductive release film was obtained in the same manner as in Example 1 except that the coating material for forming a conductive release layer was used.

Example 30

1.2 g of the silicone solution of Production Example 4, 3.6 g of the polyester resin solution of Production Example 6, 11.2 g of methyl ethyl ketone, and 0.08 g of triallyl isocyanurate (denoted as "TAIL" in the table) were added to 14 g of the conductive polymer dispersion of Production Example 3 to obtain a coating material for forming a conductive release layer. A conductive release film was obtained in the same manner as in Example 1 except that the coating material for forming a conductive release layer was used.

Comparative Example 1

4 g of the polyester resin solution of Production Example 6 and 12 g of methyl ethyl ketone were added to 14 g of the conductive polymer dispersion of Production Example 3 to obtain a coating material for forming a conductive layer. A conductive film was obtained in the same manner as in Example 1 except that this coating material for forming a conductive layer was used.

Comparative Example 2

12 g of the silicone solution of Production Example 4 and 4 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Comparative Example 3

4 g of the polyester resin solution of Production Example 7 and 12 g of methyl ethyl ketone were added to 14 g of the conductive polymer dispersion of Production Example 3 to obtain a coating material for forming a conductive layer. A conductive film was obtained in the same manner as in Example 1 except that this coating material for forming a conductive layer was used.

Comparative Example 4

12 g of the silicone solution of Production Example 5 and 4 g of methyl ethyl ketone were added to 14 g of the conductive polymer dispersion of Production Example 3 to obtain a coating material for forming a conductive release layer. A conductive release film was obtained in the same manner as in Example 1 except that the coating material for forming a conductive release layer was used.

Comparative Example 5

14 g of the conductive polymer dispersion of Production Example 3 was changed to 14 g of methyl ethyl ketone to obtain a coating material for forming a release layer. A release film was obtained in the same manner as in Example 1 except that the coating material for forming a release layer was used.

Comparative Example 6

14 g of the conductive polymer dispersion of Production Example 3 was changed to 14 g of methyl ethyl ketone to obtain a coating material for forming a release layer. A release film was obtained in the same manner as in Example 15 except that this coating material for forming a release layer was used.

<Evaluation>
[Measurement of Surface Resistance Value]

The surface resistance value $R_0$ of the conductive release layer of the conductive release film or the conductive layer of the conductive film immediately after being obtained was measured using a resistivity meter (Hiresta, manufactured by Mitsubishi Chemical Analytech Co., Ltd.) under conditions of an applied voltage of 10 V.

In addition, the conductive release film or the conductive film was allowed to stand for 1 day in a state where air struck the surface of the conductive release layer or the conductive layer in an environment of a temperature of 25° C. and a relative humidity of 50%, and then the surface resistance value $R_1$ was measured in the same manner as described above.

The measurement results and the values of $R_1/R_0$ are shown in Tables 1 to 3. The smaller the value of $R_1/R_0$, the smaller the deterioration in conductivity over time in the air.

[Measurement of Peeling Force]

A polyester adhesive tape (No. 31B, manufactured by Nitto Denko Corporation) having a width of 25 mm was placed on the surface of the conductive release layer or the conductive layer, and then a load of 1,976 Pa was placed on the adhesive tape and subjected to a heat treatment at 25° C. for 20 hours to attach the polyester adhesive tape to the conductive release layer or the conductive layer. Using a tensile tester, the polyester adhesive tape was peeled (peeling rate: 0.3 m/min) at an angle of 180° from the conductive release layer or the conductive layer, and the peeling force was measured. The measurement results are shown in Tables 1 to 3. The smaller the peeling force, the higher the releasing property of the conductive release layer or the conductive layer.

In addition, for comparative purposes, in Comparative Examples 5 and 6, the peeling force of the release layer not including PEDOT-PSS was measured.

TABLE 1

| Example No. | Silicone Solution Type | Silicone Amount with respect to PEDOT-PSS (times) | Polyester Resin Solution Type | Polyester Amount with respect to PEDOT-PSS (times) | Peeling Force (N/25 mm) | Surface Resistance Value ($\Omega/\square$) Initial Period $R_0$ | After Standing 1 day in the air $R_1$ | $R_1/R_0$ |
|---|---|---|---|---|---|---|---|---|
| 1 | PRODUCTION EXAMPLE 4 | 5.3 | PRODUCTION EXAMPLE 6 | 48.1 | 0.08 | $5.0 \times 10^7$ | $1.0 \times 10^8$ | 2.0 |
| 2 | PRODUCTION EXAMPLE 4 | 15.9 | PRODUCTION EXAMPLE 6 | 37.4 | 0.07 | $5.0 \times 10^8$ | $5.0 \times 10^9$ | 10.0 |
| 3 | PRODUCTION EXAMPLE 4 | 26.4 | PRODUCTION EXAMPLE 6 | 26.7 | 0.06 | $8.0 \times 10^8$ | $2.0 \times 10^9$ | 2.5 |
| 4 | PRODUCTION EXAMPLE 4 | 37.0 | PRODUCTION EXAMPLE 6 | 16.0 | 0.05 | $2.0 \times 10^8$ | $3.0 \times 10^9$ | 15.0 |
| 5 | PRODUCTION EXAMPLE 4 | 47.6 | PRODUCTION EXAMPLE 6 | 5.3 | 0.06 | $1.0 \times 10^9$ | $3.0 \times 10^{10}$ | 30.0 |
| 6 | PRODUCTION EXAMPLE 4 | 52.9 | PRODUCTION EXAMPLE 6 | 53.4 | 0.06 | $1.0 \times 10^9$ | $1.0 \times 10^{10}$ | 10.0 |
| 7 | PRODUCTION EXAMPLE 4 | 13.2 | PRODUCTION EXAMPLE 6 | 13.4 | 0.06 | $7.0 \times 10^7$ | $4.0 \times 10^9$ | 57.1 |
| 8 | PRODUCTION EXAMPLE 4 | 5.3 | PRODUCTION EXAMPLE 7 | 48.1 | 0.09 | $1.0 \times 10^8$ | $3.0 \times 10^9$ | 30.0 |
| 9 | PRODUCTION EXAMPLE 4 | 15.9 | PRODUCTION EXAMPLE 7 | 37.4 | 0.09 | $1.0 \times 10^8$ | $3.0 \times 10^8$ | 3.0 |
| 10 | PRODUCTION EXAMPLE 4 | 26.4 | PRODUCTION EXAMPLE 7 | 26.7 | 0.07 | $1.0 \times 10^8$ | $2.0 \times 10^9$ | 20.0 |
| 11 | PRODUCTION EXAMPLE 4 | 37.0 | PRODUCTION EXAMPLE 7 | 16.0 | 0.06 | $2.0 \times 10^8$ | $1.0 \times 10^9$ | 5.0 |
| 12 | PRODUCTION EXAMPLE 4 | 47.6 | PRODUCTION EXAMPLE 7 | 5.3 | 0.09 | $1.0 \times 10^9$ | $4.0 \times 10^{10}$ | 40.0 |
| 13 | PRODUCTION EXAMPLE 4 | 52.9 | PRODUCTION EXAMPLE 7 | 53.4 | 0.08 | $2.0 \times 10^9$ | $2.0 \times 10^{10}$ | 10.0 |
| 14 | PRODUCTION EXAMPLE 4 | 13.2 | PRODUCTION EXAMPLE 7 | 13.4 | 0.08 | $3.0 \times 10^7$ | $2.0 \times 10^8$ | 6.7 |

TABLE 2

| Example No. | Silicone Solution Type | Silicone Amount with respect to PEDOT-PSS (times) | Polyester Resin Solution Type | Polyester Amount with respect to PEDOT-PSS (times) | Other Notes | Peeling Force (N/25 mm) | Surface Resistance Value ($\Omega/\square$) Initial Period $R_0$ | After Standing 1 day in the air $R_1$ | $R_1/R_0$ |
|---|---|---|---|---|---|---|---|---|---|
| 15 | PRODUCTION EXAMPLE 5 | 5.3 | PRODUCTION EXAMPLE 6 | 48.1 | — | 0.07 | $3.0 \times 10^7$ | $1.0 \times 10^8$ | 3.3 |
| 16 | PRODUCTION EXAMPLE 5 | 15.9 | PRODUCTION EXAMPLE 6 | 37.4 | — | 0.05 | $3.0 \times 10^9$ | $1.0 \times 10^{10}$ | 3.3 |
| 17 | PRODUCTION EXAMPLE 5 | 26.4 | PRODUCTION EXAMPLE 6 | 26.7 | — | 0.04 | $4.0 \times 10^9$ | $1.0 \times 10^{10}$ | 2.5 |
| 18 | PRODUCTION EXAMPLE 5 | 37.0 | PRODUCTION EXAMPLE 6 | 16.0 | — | 0.04 | $6.0 \times 10^8$ | $2.0 \times 10^9$ | 3.3 |
| 19 | PRODUCTION EXAMPLE 5 | 47.6 | PRODUCTION EXAMPLE 6 | 5.3 | — | 0.04 | $1.0 \times 10^8$ | $2.0 \times 10^9$ | 20.0 |
| 20 | PRODUCTION EXAMPLE 5 | 52.9 | PRODUCTION EXAMPLE 6 | 53.4 | — | 0.05 | $2.0 \times 10^{10}$ | $1.0 \times 10^{11}$ | 5.0 |
| 21 | PRODUCTION EXAMPLE 5 | 13.2 | PRODUCTION EXAMPLE 6 | 13.4 | — | 0.06 | $6.0 \times 10^7$ | $7.0 \times 10^8$ | 11.6 |
| 22 | PRODUCTION EXAMPLE 5 | 5.3 | PRODUCTION EXAMPLE 7 | 48.1 | — | 0.05 | $5.0 \times 10^6$ | $6.0 \times 10^7$ | 12.0 |
| 23 | PRODUCTION EXAMPLE 5 | 15.9 | PRODUCTION EXAMPLE 7 | 37.4 | — | 0.06 | $2.0 \times 10^7$ | $5.0 \times 10^8$ | 25.0 |
| 24 | PRODUCTION EXAMPLE 5 | 26.4 | PRODUCTION EXAMPLE 7 | 26.7 | — | 0.06 | $1.0 \times 10^8$ | $5.0 \times 10^9$ | 50.0 |
| 25 | PRODUCTION EXAMPLE 5 | 37.0 | PRODUCTION EXAMPLE 7 | 16.0 | — | 0.06 | $5.0 \times 10^8$ | $5.0 \times 10^9$ | 10.0 |

TABLE 2-continued

| | Silicone Solution | | Polyester Resin Solution | | | | Surface Resistance Value ($\Omega$/ ) | | |
|---|---|---|---|---|---|---|---|---|---|
| | | Silicone Amount with respect to PEDOT-PSS (times) | | Polyester Amount with respect to PEDOT-PSS (times) | | Peeling Force (N/25 mm) | Initial Period $R_0$ | After Standing 1 day in the air $R_1$ | $R_1/R_0$ |
| Example No. | Type | | Type | | Other Notes | | | | |
| 26 | PRODUCTION EXAMPLE 5 | 47.6 | PRODUCTION EXAMPLE 7 | 5.3 | — | 0.05 | $1.0 \times 10^8$ | $2.0 \times 10^{10}$ | 200.0 |
| 27 | PRODUCTION EXAMPLE 5 | 52.9 | PRODUCTION EXAMPLE 7 | 53.4 | — | 0.06 | $1.0 \times 10^9$ | $7.0 \times 10^{10}$ | 70.0 |
| 28 | PRODUCTION EXAMPLE 5 | 13.2 | PRODUCTION EXAMPLE 7 | 13.4 | — | 0.06 | $2.0 \times 10^7$ | $5.0 \times 10^8$ | 25.0 |
| 29 | PRODUCTION EXAMPLE 4 | 5.3 | PRODUCTION EXAMPLE 6 | 48.1 | DMSO added | 0.08 | $5.0 \times 10^6$ | $1.0 \times 10^7$ | 2.0 |
| 30 | PRODUCTION EXAMPLE 4 | 5.3 | PRODUCTION EXAMPLE 6 | 48.1 | TAIC added | 0.08 | $5.0 \times 10^7$ | $5.0 \times 10^7$ | 1.0 |

TABLE 3

| | Silicone Solution | | Polyester Resin Solution | | | | Surface Resistance Value ($\Omega$/ ) | | |
|---|---|---|---|---|---|---|---|---|---|
| | | Silicone Amount with respect to PEDOT-PSS (times) | | Polyester Amount with respect to PEDOT-PSS (times) | | Peeling Force (N/25 mm) | Initial Period $R_0$ | After Standing 1 day in the air $R_1$ | $R_1/R_0$ |
| Comparative Example No. | Type | | Type | | | | | | |
| 1 | — | 0.0 | PRODUCTION EXAMPLE 6 | 53.4 | | 9.80 | $2.0 \times 10^7$ | $4.0 \times 10^7$ | 2.0 |
| 2 | PRODUCTION EXAMPLE 4 | 52.9 | — | 0.0 | | 0.08 | $2.0 \times 10^9$ | OVER | Calculation not possible |
| 3 | — | 0.0 | PRODUCTION EXAMPLE 7 | 53.4 | | 8.84 | $4.0 \times 10^6$ | $1.0 \times 10^7$ | 2.5 |
| 4 | PRODUCTION EXAMPLE 5 | 52.9 | — | 0.0 | | 0.07 | $2.0 \times 10^{10}$ | OVER | Calculation not possible |
| 5 | PRODUCTION EXAMPLE 4 | — | PRODUCTION EXAMPLE 6 | — | | 0.09 | OVER | OVER | Calculation not possible |
| 6 | PRODUCTION EXAMPLE 5 | — | PRODUCTION EXAMPLE 6 | — | | 0.08 | OVER | OVER | Calculation not possible |

The conductive release film of each example provided with a conductive release layer including silicone and polyester resin had a releasing property equal to or higher than that of the release layer not including PEDOT-PSS, and the deterioration in conductivity over time in the air was suppressed.

In the conductive films of Comparative Examples 1 and 3, since silicone was not contained in the conductive layer, a releasing property was not obtained.

In the conductive release films of Comparative Examples 2 and 4, since the polyester resin was not included in the conductive release layer, the conductivity was decreased over time in the air.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A coating material for forming a conductive release layer comprising:
    a conductive composite including a π-conjugated conductive polymer and a polyanion;
    an epoxy compound having an epoxy group;
    a curable silicone;
    a polyester resin having a glass transition temperature between 40° C. and 90° C.; and
    an organic solvent,
    wherein the mass ratio of the polyester resin to the conductive composite is from 5.3 to 53.4, and the coating material is free of a surfactant as an additive.

2. The coating material for forming a conductive release layer according to claim 1,
wherein the curable silicone is an addition-curable silicone.

3. The coating material for forming a conductive release layer according to claim 1, further comprising:
a platinum catalyst which accelerates curing of the curable silicone.

4. The coating material for forming a conductive release layer according to claim 1,
wherein the epoxy compound further has a vinyl group.

5. The coating material for forming a conductive release layer according to claim 4,
wherein the epoxy compound is 1,2-epoxy-4-vinylcyclohexane.

6. The coating material for forming a conductive release layer according to claim 1,
wherein the epoxy group of the epoxy compound and an anion group of the polyanion are chemically bonded.

7. The coating material for forming a conductive release layer according to claim 1,
wherein the organic solvent is at least one of methyl ethyl ketone and toluene.

8. The coating material for forming a conductive release layer according to claim 1,
wherein the π-conjugated conductive polymer is poly(3,4-ethylenedioxythiophene).

9. The coating material for forming a conductive release layer according to claim 1,
wherein the polyanion is a polystyrene sulfonic acid.

10. The coating material for forming a conductive release layer according to claim 1, further comprising:
an additional conductive agent.

11. The coating material for forming a conductive release layer according to claim 1, further comprising:
triallyl isocyanurate.

12. A method for producing a conductive release film, comprising:
coating the coating material for forming a conductive release layer according to any one of claims 1 to 11 on at least one surface of a film base material; and
heating and drying the coated coating material for forming a conductive release layer.

13. The coating material for forming a conductive release layer according to claim 1, wherein the polyester resin is selected from polyethylene terephthalate, polybutylene terephthalate, polyethylene naphthalate, and polymethylene terephthalate.

14. The coating material for forming a conductive release layer according to claim 1, wherein the polyester resin has a number average molecular weight between 10,000 or more and 50,000 or less.

15. A method for producing a coating material for forming a conductive release layer, the method comprising:
adding an epoxy compound having an epoxy group to an aqueous dispersion comprising a conductive composite containing a π-conjugated conductive polymer and a polyanion in an aqueous dispersion medium;
precipitating a conductive composite to obtain a precipitate;
recovering the precipitate; and
adding an organic solvent, a curable silicone, and a polyester resin having a glass transition temperature between 40° C. and 90° C. to the recovered precipitate to produce the coating material,
wherein the mass ratio of the polyester resin to the conductive composite is from 5.3 to 53.4, and the coating material is free of a surfactant as an additive.

16. The method for producing a coating material for forming a conductive release layer according to claim 15,
wherein the curable silicone is an addition-curable silicone.

17. The method for producing a coating material for forming a conductive release layer according to claim 15, further comprising:
adding a platinum catalyst which accelerates curing of the curable silicone.

18. The method for producing a coating material for forming a conductive release layer according to claim 15,
wherein the epoxy compound further has a vinyl group.

19. The method for producing a coating material for forming a conductive release layer according to claim 18,
wherein the epoxy compound is 1,2-epoxy-4-vinylcyclohexane.

20. A conductive release film comprising:
a film base material; and
a conductive release layer formed from a coating material coated on at least one surface of the film base material,
wherein the conductive release layer contains a conductive composite including a π-conjugated conductive polymer and a polyanion, an epoxy compound having an epoxy group, a silicone, and a polyester resin having a glass transition temperature between 40° C. and 90° C., the mass ratio of the polyester resin to the conductive composite is from 5.3 to 53.4, and the epoxy compound having an epoxy group is bonded to the anion group of a part of the polyanion.

21. The conductive release film according to claim 20,
wherein the film base material is a polyethylene terephthalate film.

* * * * *